July 27, 1943.  G. USLAN  2,325,558
HEIGHT GAUGE
Filed May 30, 1942   2 Sheets-Sheet 1

INVENTOR
George Uslan
BY
Joseph F. O'Brien
ATTORNEY

July 27, 1943.    G. USLAN    2,325,558
HEIGHT GAUGE
Filed May 30, 1942    2 Sheets-Sheet 2
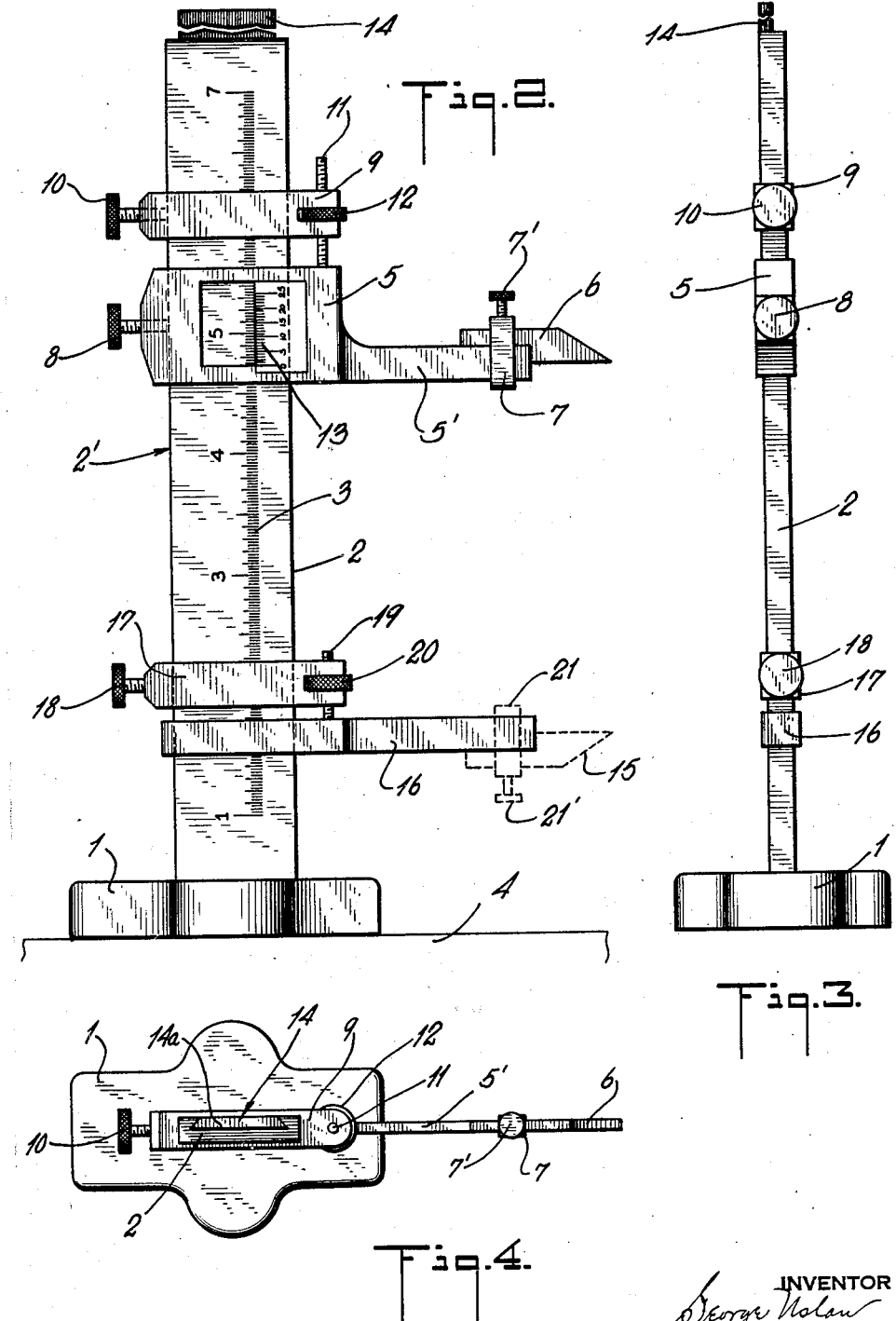

Patented July 27, 1943

2,325,558

UNITED STATES PATENT OFFICE 2,325,558

HEIGHT GAUGE

George Uslan, Irvington, N. J., assignor of one-fourth to Donald O'Brien, Englewood, N. J.

Application May 30, 1942, Serial No. 445,112

3 Claims. (Cl. 33—169)

This invention relates to improvements in height gauges.

In working with height gauges, it often happens that an intermediate measurement (viz., a measurement between the ends of a piece of work that must be made after one or more measurements have been taken from the base on an end thereof), requires great accuracy or precision while the end or lower measurement or measurements may require only a rough or approximate gauging. Heretofore, in using gauges now on the market, the accuracy of an intermediate measurement necessarily depended upon the accuracy of the end measurement or measurements because such end measurement must first be accurately measured or gauged and then the intermediate measurement and the end measurement must be jointly included in measurements from the base, the primary, end or lower measurement or measurements being then subtracted to determine the intermediate measurement. It is one of the objects of my invention to avoid such multiple measuring by providing a shiftable measurement-starting and scale member combined with a conventional shiftable measurement-determining member to enable a zero indication and approximate or precisely accurate measurements to be made between any two points along the length of an upright standard gauge, and thus to permit the end measurements to be made roughly while an intermediate measurement may be made independently of such end measurement, and consequently to permit such intermediate measurement to be made as fine or accurately as is necessary, while the other end measurements may be rough or approximate. With this end in view I employ a conventional stationary upright gauge member comprising the usual stationary upright member preferably provided with a scale and with a measurement-determining pointer-carrier member slidably mounted thereon, and combine therewith a sliding-scale member movable into measuring relationship to said measurement-determining sliding pointer-carrier member and also provide at the lower end of said sliding scale member a pointer-carrier member adapted to permit zero indication in regard to the sliding scale at any point along the length of a piece of work.

Another object of my invention is, in a height gauge, to provide an upright scale member preferably graduated from the base and having mounted thereon a conventional slidable primary pointer-carrier member provided with a vernier scale adapted to cooperate in measuring with said primary stationary scale, in combination with a secondary scale member slidably mounted in said upright stationary member and arranged in cooperative measuring relationship to said primary carrier-member and a vernier and also having at its lower end a zero or measurement-starting pointer-carrier which is itself carried by said slidable scale member and therefore movable relatively to said primary pointer-carrier so that intermediate measurements may be begun from any given position along length of the upright gauge by a shifting of the sliding scale member to the proper starting position and measurements may be thus taken on the sliding scale member in cooperation with the primary pointer-carrier member and its vernier and these intermediate measurements may be made independently of any other measurements with as great accuracy as is necessary by the use of the primary pointer or employment of vernier and said primary pointer and carrier therefor.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which—

Fig. 2 is a similar view in elevation of the opposite side of upright member, its stationary scale and primary pointer-carrier in position for conventional end measurements, the sliding scale pointer being removed and shown on the dotted lines in reverse position; for contact with overhanging ledges on the work;

Fig. 3 is a view in end or rear elevation of the height gauge shown in Figs. 1 and 2; and Fig. 4 is a top plan view of the gauge shown in Figs. 1 to 3.

Figure 1:
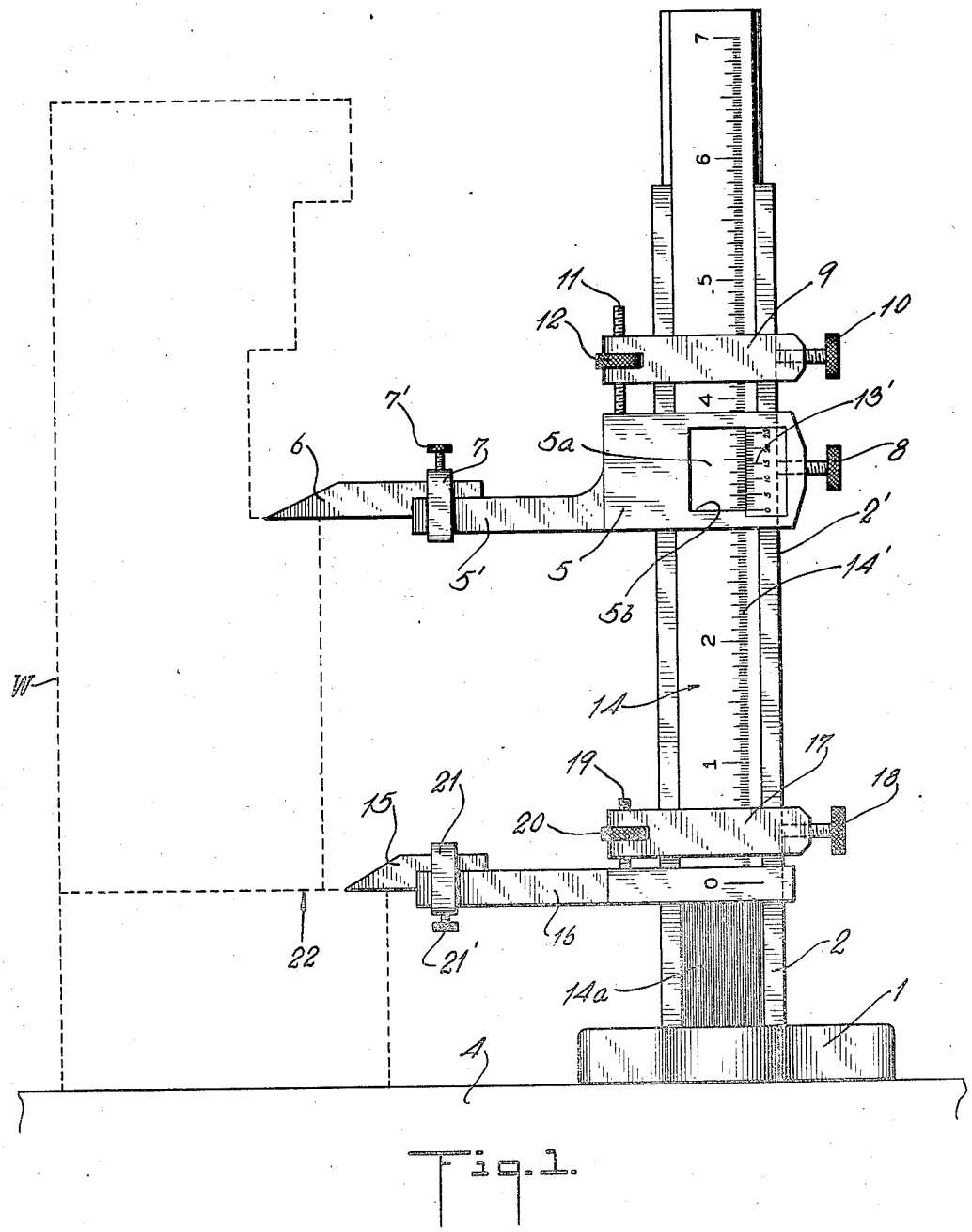
Fig. 1 is a view in elevation of one side of my height gauge with the sliding scale member and its starting pointer moved upwardly in relation to the stationary scale member and the indicating pointers or blades starting an intermediate measurement on the sliding scale.

Referring now to these drawings, which illustrate a preferred embodiment of my invention, 1 indicates a base member of any simple design or construction on or in which is mounted a stationary upright member 2 provided, as more particularly shown in Fig. 2, with a suitably graduated scale 3 which, as shown, is adapted to measure from a suitable flat plate or the like 4 on which the work to be measured is mounted. The scaled stationary upright member 2 has slidably mounted thereon in conventional manner a primary measurement-determining carrier 5 provided with a projecting arm 5' carrying an indicator blade 6 which is preferably removably mounted on the arm 5 by means of a strap 7 and set screw 7'. The measurement-determining carrier 5 is also provided at one edge with a set screw 8 adapted to take against an edge 2' of the stationary member 2 and thus to permit the fixing of the carrier 5 in any suitable position along the stationary member 2.

In order to provide for precise adjustment of the carrier 5, I employ a conventional adjusting member 9 which is similarly provided at one edge with a set screw 10 which also takes against the edge 2' of the stationary member 2. This adjusting member has at its front edge an adjusting screw 11 manually shiftable by means of a knurled nut 12 fitted in a kerf in the edge of the member 9.

The devices above described provide for measurements from a suitable base plate 4 or from the top of the base as desired, and a stationary member 2 of this type may contain a single scale 3 or a plurality of scales if so desired, and in the embodiment of my invention shown, the carrier 5 is provided with a vernier scale 13 adapted to cooperate with the scale 3 on the stationary member in order to enable greater accuracy and minuteness of measurement to be accomplished. The members hereinabove described constitute a conventional arrangement of elements adapted to enable the measuring of any suitable distances from a suitable base, such as the surface plate 4 or the like.

In accordance with my improvement, I mount in the stationary member 2 a sliding member 14 which is also provided with a scale 14' and which is preferably inset into the stationary member 2 so as to be movable vertically within a seat 14a provided therefor in one face or side of said upright stationary member 2. The sliding member 14 also preferably slides beneath and through the primary measurement-determining sliding carrier 5 which is also provided at the side cooperating with the sliding scale with a window 5a having the usual straight-edge 5b adapted to cooperate with the scale 14' on the sliding member 14 to determine measurements on said sliding scale. This side of the carrier 5 cooperating with the sliding scale also is preferably provided with a vernier scale 13' which is adapted to cooperate in well-known manner with the sliding scale for the purpose of providing means to procure accuracy of measurement. In accordance with my said improvement, the scale member 14 is provided at its lower edge with a zero or measurement-starting member comprising, as shown, a pointer 15 carried by a measurement-starting carrier 16 which is preferably mounted on and carried in any suitable manner by the sliding scale member 14. The measurement-starting carrier 16 is also preferably provided with adjusting member 17 adapted to be locked in position by a set-screw 18 and having means for adjusting the carrier comprising an adjusting screw 19 mounted in a kerf in the adjusting member and operable by knurled nut 20. The pointer blade 15 is also removably mounted on the projecting arm of the carrier 16 by means of the strap 21 and set screw 21'.

In operating this gauge construction, when the adjustable zero or measurement-starting member is accurately adjusted to the lower extremity of an intermediate dimension, it will be apparent that an accurate reading may be made of such intermediate measurement between the measurement-starting member 15 and the measurement-determining member 6 and that this measurement may be taken independently of any initial or earlier measurements, such as a measurement between the surface plate 4 and the ledge 22 on the piece of work.

It will thus be seen that a height gauge is provided that may be used to measure any such intermediate measurement and that such intermediate measurement will be totally independent of any prior measurements from the base upwardly of the piece of work, and consequently that I will be enabled to save time where the first or end measurements require only approximate or rough measurements while measurements from higher or intermediate positions of the work require more accurate measurement or adjustment, and furthermore that I provide a very simple mechanism that will not only have all the conventional advantages of other height scales with stationary scales and movable carriers but will in addition provide for an independent measurement between any two points above the base or surface plate.

Having described my invention, I claim:

1. A height gauge embodying in combination an elongated relatively stationary body member, a transversely-disposed measurement-determining member comprising a carrier slidably mounted on said body member and a pointer carried by said carrier, a longitudinally-disposed sliding scale member mounted to slide longitudinally in relation to said body member and arranged in cooperative measuring relationship to said transversely-disposed slidable measurement-determining member, and a measurement-starting pointer-member carried by said longitudinally-disposed scale member.

2. A height gauge embodying in combination an elongated relatively stationary body member, a transversely-disposed measurement-determining member comprising a carrier slidably mounted on said body member and a pointer carried by said carrier, a longitudinally-disposed sliding scale member mounted to slide longitudinally in relation to said body member and arranged in cooperative measuring relationship to said transversely-disposed slidable measurement-determining member, and a measurement-starting pointer-member carried by said longitudinally-disposed scale member, said slidable measurement-determining member being provided with a vernier scale adapted to cooperate with the graduations of said sliding scale member, and said stationary body member also being provided with a scale adapted to cooperate with said transversely-disposed measurement-determining member and said measurement-determining member also being provided with a second vernier scale adapted in measuring to cooperate with the body member scale on said stationary body member.

3. A height gauge embodying, in combination, a relatively stationary body member, a transversely-disposed measurement-determining member comprising a carrier slidably mounted on said body member and a pointer carried by said carrier, a longitudinally-disposed sliding scale member mounted to slide longitudinally in relation to said body member and arranged in cooperative measuring relationship to said transversely-disposed measurement-determining member, a measurement-starting pointer-member carried by said longitudinally-disposed sliding scale member, means for fixing and adjusting the position of said measurement-determining member in relation to said stationary body member, an adjusting member slidably mounted on and lockable in relation to said stationary member, and means connected with said last-mentioned adjusting member and embodying a screw and nut control device for finely adjusting the measurement-starting pointer by moving the sliding scale member relatively to said last-mentioned adjusting member.

GEORGE USLAN.